United States Patent
Danielson et al.

(10) Patent No.: US 12,392,444 B2
(45) Date of Patent: Aug. 19, 2025

(54) STABILIZATION OF FLOW BY MOVEABLE CHOKE

(71) Applicant: ConocoPhillips Company, Houston, TX (US)

(72) Inventors: Thomas J. Danielson, Houston, TX (US); Brian P. Dyer, Houston, TX (US); Probjot Singh, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 294 days.

(21) Appl. No.: 17/729,782

(22) Filed: Apr. 26, 2022

(65) Prior Publication Data

US 2022/0341534 A1 Oct. 27, 2022

Related U.S. Application Data

(60) Provisional application No. 63/179,908, filed on Apr. 26, 2021.

(51) Int. Cl.
*F16L 55/46* (2006.01)

(52) U.S. Cl.
CPC .................. *F16L 55/46* (2013.01)

(58) Field of Classification Search
CPC ... B08B 9/0553; B08B 9/0558; B08B 9/0495; B05C 7/08; F16L 58/1009; F16L 55/46
USPC ...... 15/104.061; 134/8, 22.11, 22.12, 167 C, 134/168 C
See application file for complete search history.

(56) References Cited

U.S. PATENT DOCUMENTS

| | | | |
|---|---|---|---|
| 4,411,039 A | 10/1983 | Timmins et al. | |
| 5,617,604 A * | 4/1997 | Erich | B08B 9/055 |
| | | | 15/104.063 |
| 5,875,803 A * | 3/1999 | Leitko | B08B 9/0553 |
| | | | 134/167 C |
| 6,370,721 B1 * | 4/2002 | Torres, Jr. | B08B 9/0551 |
| | | | 15/104.061 |
| 7,998,276 B1 | 8/2011 | Baugh | |
| 8,286,479 B2 | 10/2012 | Harvey et al. | |
| 8,479,345 B2 | 7/2013 | Ludlow et al. | |
| 8,650,694 B2 | 2/2014 | Pruett et al. | |
| 2007/0286682 A1 * | 12/2007 | Freyer | F16L 55/48 |
| | | | 405/184.1 |
| 2009/0199873 A1 | 8/2009 | Pruett | |

(Continued)

FOREIGN PATENT DOCUMENTS

WO WO-2020094975 A1 5/2020

OTHER PUBLICATIONS

International Search Report and Written Opinion of the International Searching Authority for International Application No. PCT/US2022/026326 dated Jul. 19, 2022 (17 pages).

(Continued)

*Primary Examiner* — Katina N. Henson
(74) *Attorney, Agent, or Firm* — Polsinelli PC

(57) ABSTRACT

A method to reduce slugging in a pipeline, including flowing a fluid flow through a pipeline having a fluid flow path extending therethrough and determining a presence of a slug within the fluid flow path of the pipeline. Launching a chokeable pig into the fluid flow path, anchoring the chokeable pig at a predetermined location within the fluid flow path, and adjusting the pressure drop through the pipeline.

20 Claims, 6 Drawing Sheets

(56) References Cited

U.S. PATENT DOCUMENTS

| | | | |
|---|---|---|---|
| 2014/0283876 A1* | 9/2014 | Fjerdingstad | B08B 9/0535 |
| | | | 134/8 |
| 2019/0078722 A1 | 3/2019 | Theener | |
| 2020/0080910 A1* | 3/2020 | Da Silva | F16L 55/46 |

OTHER PUBLICATIONS

Extended European Search Report for Application No. 22796545.6 dated Jan. 28, 2025 (11 pages).

* cited by examiner

STABILIZATION OF FLOW BY MOVEABLE CHOKE

CROSS-REFERENCE TO RELATED APPLICATIONS

The present application claims priority to U.S. Provisional Application No. 63/179,908, entitled "STABILIZATION OF FLOW BY MOVEABLE CHOKE" and filed on Apr. 26, 2021, which is specifically incorporated by reference herein in its entirety.

FIELD

The present inventive concept relates generally clearing and/or preventing slugging within a pipeline and/or a facility connected with a pipeline, thereby stabilizing flow within the pipeline.

BACKGROUND

Pipelines are utilized through the oil and gas industry to transport hydrocarbons through various phases of production and distribution. Gas slugs and/or liquid slugs can build up within these pipelines reducing the capacity or throughput of the pipeline. These slugs can travel within the pipeline to a facility connected with the pipeline causing issues within the facility itself.

SUMMARY

The present inventive concept remedies the aforementioned by providing a system and method to reduce slugging in a pipeline. The method includes flowing a fluid flow through a pipeline, the pipeline having a fluid flow path formed therethrough, determining a presence of a slug within the fluid flow path of the pipeline, launching a chokeable pig into the fluid flow path, anchoring the chokeable pig at a predetermined location within the fluid flow path, and adjusting the pressure drop across the anchored pig.

The method can also include de-anchoring the chokeable pig from the predetermined location. The method can also include retrieving the chokeable pig from the fluid flow path.

The chokeable pig is operable to introduce a choke point in the fluid flow path, thereby inducing an optimal fluid flow within the pipeline. The chokeable pig can have an adjustable choke.

The chokeable pig is operable to be anchored at a second predetermined location within the fluid flow path following the de-anchoring of the chokeable pig at the predetermined location.

The chokeable pig can have a predetermined choke position for each of the predetermined locations within the pipeline.

Anchoring the chokeable pig can include engaging at least a portion of the chokeable pig with an interior sidewall of the pipeline.

The slug within the pipeline can be a gaseous slug, a liquid slug, and/or a combination thereof. The fluid flow path of the pipeline can be fluidly coupled with a downstream facility. In this manner, the present inventive concept advantageously provides an ability to adjust the pressure drop, thereby producing an optimum fluid flow within the pipeline downstream of the chokeable pig.

The system may be a pipeline intervention chokeable pig system, which can include a pipeline having a fluid flow path with a fluid flow therein and a launcher fluidly coupled with the pipeline. The launcher can have an access pipe and an access hatch coupled with a distal end of the access pipe. A pig device can be operable to be disposed within a fluid flow path of a pipeline and the pig device can be operable receive the fluid flow therethrough. A choke can be coupled with the pig device and disposed within the fluid flow. The choke can be adjustable.

The pig device can have at least one anchor operable to engage at least a portion of an interior surface of the pipeline. The pig device can be operable to be anchored at one or more predetermined locations within the pipeline. The pig device can be operable to releasably anchor and/or de-anchor at any number of predetermined locations within the pipeline.

The pig device can be operable to receive a first fluid flow at an inlet upstream of the choke, and produce a second fluid flow downstream of the choke, wherein the second fluid flow can be an optimized fluid flow that is optimized relative to the first fluid flow. It is foreseen that the second flow may be optimized relative to the first fluid flow by adjusting one or more characteristics of the first flow. For instance, the first fluid flow can have a multiphase flow having a series of liquid slugs are separated by relatively large gas pockets which can reduce the flow of liquid and/or gas within the multiphase flow, while the second flow can be optimized by adjusting a flow property of the liquid and/or the gas within the multiphase flow to prevent the liquid and/or gas slugs. In the second, optimized, flow the gas flow can travel smoothly over the surface of a heavier liquid flow, thereby eliminating separated gas and/or liquid pockets (e.g. slugs) within the flow.

The pig device can be operable to be placed in the access pipe via an access hatch, and the access pipe can be operable to receive at least a portion of the fluid flow therein. A receiver station can be operable to receive the pig device therein downstream of the launcher. One or more sensors can be operably coupled with the pig device to determine the pig device location within the pipeline.

BRIEF DESCRIPTION OF THE DRAWINGS

Features of the present inventive concept are set forth with particularity in the appended claims. A better understanding of the features and advantages of the present inventive concept will be obtained by reference to the following detailed description that sets forth illustrative examples, in which the principles of the present inventive concept are utilized, and the accompanying drawings of which:

DETAILED DESCRIPTION

Figure 1:
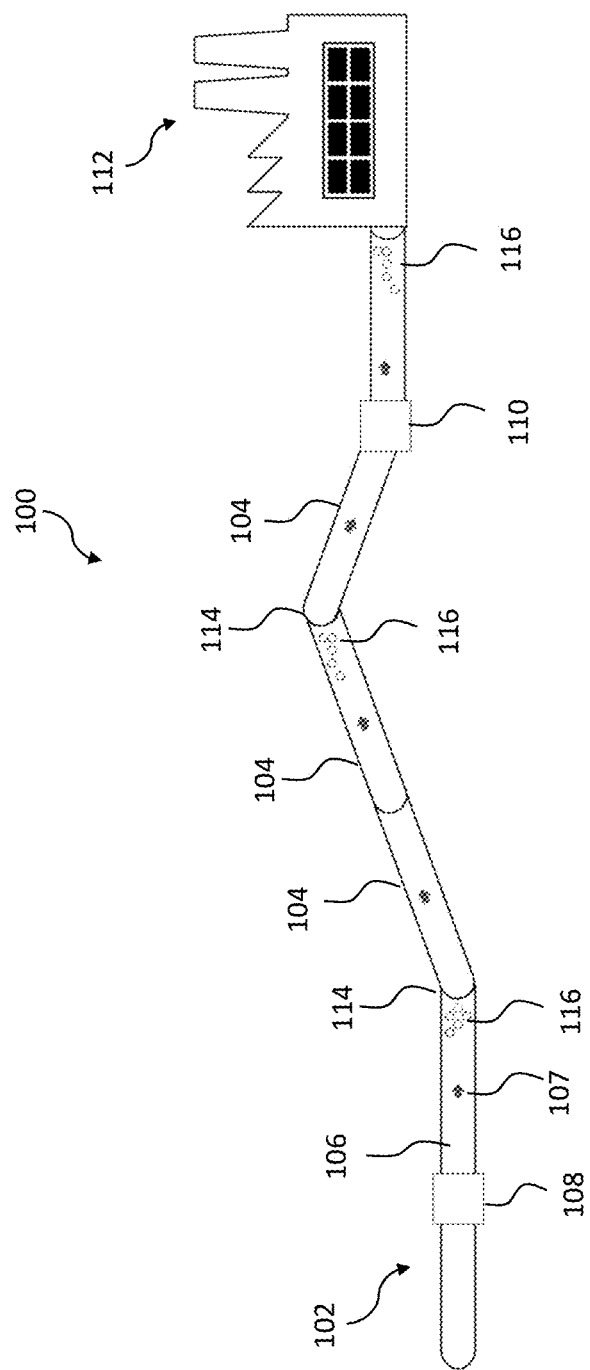
FIG. 1 is a diagrammatic representation of a pipeline connected with a facility, according to at least one instance of the present inventive concept.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

I. Terminology

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

II. General Architecture

The systems and methods disclosed herein relate to a system and method for preventing, reducing, and/or eliminating gas slugs and/or liquid slugs within a pipeline through deployment of a chokeable pig.

The presently disclosed technology may be implemented in pipelines having a multi-phase flow regime therein. Pipelines can be operable to move fluid from one location to another, in which the fluid may include and/or separate into gases and/or liquids. The fluid flow within the pipeline may lead to gas slugs and/or liquid slugs to develop in one or more locations within the pipeline, which can reduce the fluid flow through the pipeline and/or cause disruptions in downstream facilities to which the pipeline is connected. According to the present inventive concept, a pig can be introduced into the pipeline, for example at a launching station, without interrupting operations of the pipeline and anchored at a desired location. The pig can introduce a choke within the pipeline to alter the fluid flow conditions upstream of the potential or identified slug, thus preventing, reducing, and/or eliminating slugging within the pipeline and restore a more desirable or optimal fluid flow within the pipeline. The pig can then be de-anchored and removed from the pipeline.

FIG. 1 illustrates a pipeline environment, according to at least one instance of the present inventive concept. The pipeline system 100 can include a pipeline 102 formed from a plurality of pipe segments 104 coupled together to form a fluid flow path 106. The pipeline 102 can communicatively couple with one or more elements including a launching station 108, receiving station 110, and/or a facility 112 allowing fluid flow 107 therebetween. The pipeline system 100 can traverse long distances across varying terrain which can lead to changes in direction, elevation, and/or orientation at one or more joints 114 between adjacent pipe segments 104 of the pipeline 102. The changes in direction, elevation, and/or orientation of the pipeline 102 can lead to one or more slugs 116 forming within the fluid flow path 106 at the joint 114 or elsewhere in the pipeline 102. The slug 116 can reduce the fluid flow 107 through the pipeline 102, produce a non-optimal fluid flow pattern, and/or induce issues at one or more facilities 112 coupled with the pipeline 102. The non-optimal fluid flow pattern can be any non-desirable fluid flow pattern within the pipeline likely to create and/or generate slugs within fluid flow of the pipeline 102.

The slug 116 can be a collection of gas formed within a portion of the pipeline, a collection of liquid formed within the pipeline, and/or combinations thereof. In at least one instance, the slug 116 can be formed by terrain, in which a liquid can accumulate at a low point within the pipeline 102. In other instances, the slug 116 can be formed by hydrodynamics in which a gas flowing within the pipeline is traveling at a faster rate of than a liquid flowing within the pipeline 102, thereby causing waves on the surface of the liquid which can grow to a size substantially equal to a cross-sectional diameter of the fluid flow path 106 within the pipeline 102, thus causing a blockage of gas flow.

Slugs 116 within the fluid flow path 106 of the pipeline 102 can travel within in the pipeline 102 and reach the facility 112. The facility 112 can be operable to receive fluid flow 107 from the pipeline 102; however, the uneven flow caused by the slugs 116 within the pipeline can damage one or more elements of the facility including, but not limited to, one or more separators, one or more compressors, and/or otherwise general reduce the operation and efficiency of the facility 112.

Figure 2:
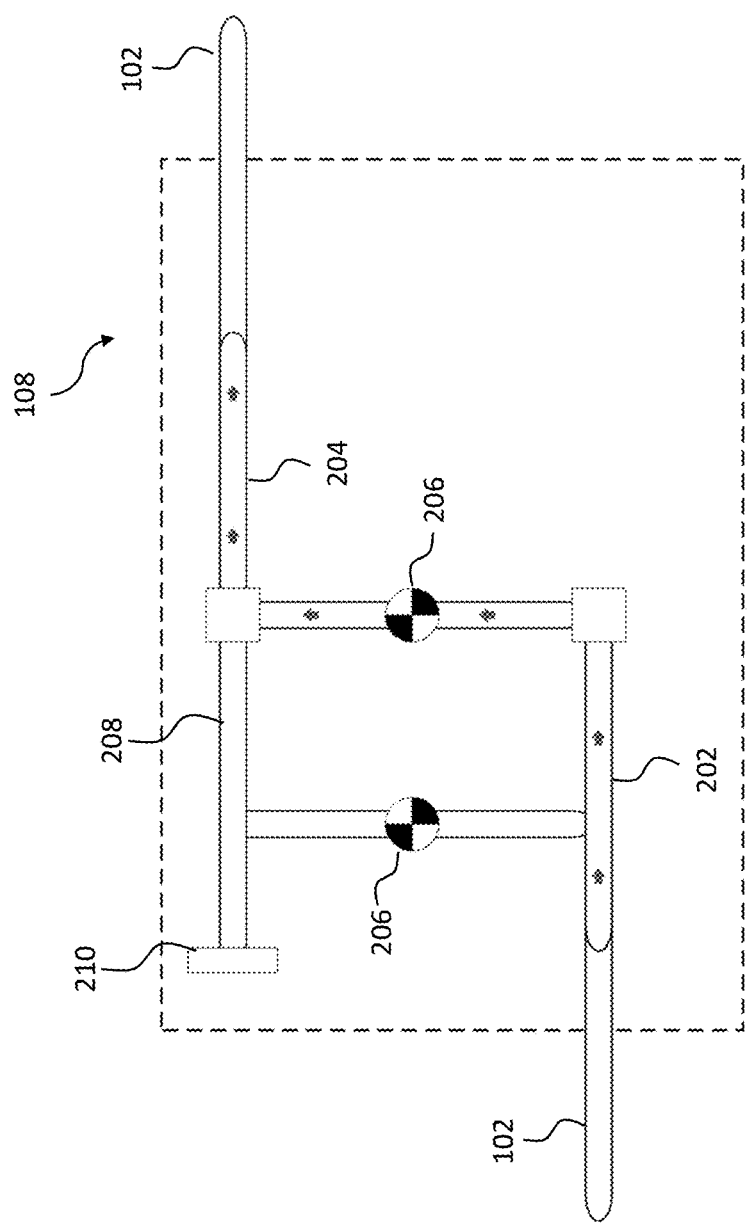
FIG. 2 is a diagrammatic representation of a launching station within a pipeline, according to at least one instance of the present inventive concept.

FIG. 2 illustrates a launching station, according to at least one instance of the present inventive concept. A launching station 108 can provide the opportunity to introduce one or more elements into the pipeline 102. The launching station 108 can include an inlet pipe 202 and an outlet pipe 204 fluidly coupled via one or more valves 206. The inlet pipe 202 can be coupled with and/or receive fluid flow from the pipeline 102, while the outlet pipe 204 can be coupled with and/or introduce fluid flow into the pipeline 102.

The launching station 108 can include an access pipe 208 having an access hatch 210 coupled therewith. The access hatch 210 can be operable to provide access to an interior of the access pipe 208, and allow introduction of one or more elements into the access pipe 208. The access pipe 208 can have one or more valves 206 coupled therewith to allow fluid flow from the pipeline 102 to be introduced into the access pipe 208, and thus introduce one or more elements into the fluid flow path of the pipeline.

The launching station 108 can be operable allow the introduction of the one or more elements into the pipeline 102 without interruption of the fluid flow within the pipeline 102.

Figure 3:
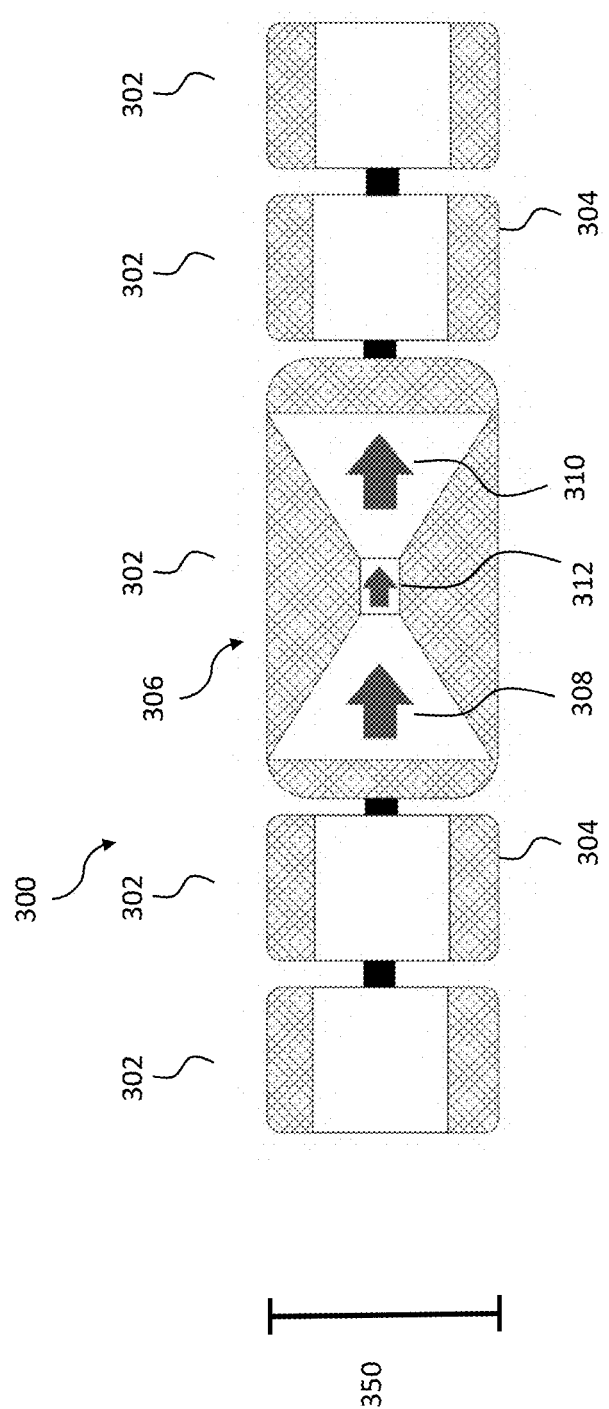
FIG. 3 is a diagrammatic view of chokeable pig, according to at least one instance of the present inventive concept.

FIG. 3 illustrates a pig operable to be introduced into a pipeline, according to at least one instance of the present inventive concept. A chokeable pig 300 can be operable to be introduced into and travel through at least a portion of a pipeline, while performing an operation within the pipeline. The chokeable pig 300 can be formed from one or more segments 302 to allow travel through the pipeline including through elevation changes, direction changes, and the like. While the chokeable pig 300 illustrated in FIG. 3 includes five (5) segments, it is within the scope of the present inventive concept to implement any number of segments including, but not limited to, one segment, two segments, three segments, four segments, six segments, or more.

The one or more segments 302 of the chokeable pig 300 can allow articulation and/or movement within the fluid flow path of the pipeline, while also having individual elements associated with each segment. The one or more segments 302 of the chokeable pig 300 can be modular allowing the chokeable pig 300 to be customized for the specific operation, pipeline, and/or slugging situation.

The chokeable pig 300 can have a cross-sectional diameter 350 less than an interior diameter of a pipeline operable to receive the chokeable pig 300 therein, thus allowing the chokeable pig 300 to traverse the pipeline. In at least one instance, the chokeable pig 300 has a cross-sectional diameter 350 at least 10 centimeters (cm) smaller than the interior diameter of the pipeline.

The chokeable pig 300 can be operably disposed within a pipeline, and configured to anchor itself at one or more predetermined positions within the pipeline. The one or more predetermined positions can be determined based on identified slugging occurring within the pipeline. The one or more predetermined locations can be upstream of the identified slugging location, but sufficiently proximal to the identified slugging location to successfully alter the fluid flow pattern within the pipeline.

In at least one instance, the chokeable pig 300 can be operable to anchor itself within the pipeline at the one or more predetermined positions by releasably engaging an interior sidewall of the pipeline and/or expanding a radial cross section of one or more segments 302 of the chokeable pig 300. Upon reaching the one of the one or more predetermined positions within the pipeline, at least a portion of the chokeable pig 300 can engage at least a portion of the interior sidewall of the pipeline, thereby anchoring the chokeable pig 300 at one of the one or more predetermined positions. In at least one instance, at least a portion of the chokeable pig 300 can be operable to expand the radial cross-sectional diameter to be equal to or greater than a radial cross-sectional diameter of the pipeline, thus anchoring the chokeable pig 300 within the pipeline. Upon completion of the operation, the chokeable pig 300 can disengage the interior sidewall of the pipeline, thus de-anchoring itself, and continuing traversing the pipeline.

One or more sensors 304 can be coupled with and/or disposed on the chokeable pig 300 operable to identify the one or more predetermined locations within the pipeline. The one or more sensors 304 can include, but are not limited to, a flow meter, a distance sensor, a tag reader, timer and/or the like. The one or more sensors 304 can be operable to assist the chokeable pig 300 in determining the approximate location within a pipeline by providing information about the distanced traveled and/or pipeline segment identification. In at least one instance, the chokeable pig 300 can include a flow meter as at least one of the one or more sensors 304 with the flow meter operable to detect fluid flow rate within the pipeline to determine a travel distance of the chokeable pig 300 within a pipeline, thereby determining when the chokeable pig 300 is positioned at the appropriate position of the one or more positions. In other instances, the chokeable pig 300 can include a distance sensor as at least one of the one or more sensors 304 wherein the distance sensor communicatively couples with an interior surface of the pipeline to determine a travel distance of the chokeable pig 300 within the pipeline, thereby determining when the chokeable pig 300 is positioned at the appropriate position of the one or more positions. The distance sensor can be a wheel having a known circumference rolling along an interior surface of the pipeline to determine travel distance, or the distance sensor can be camera, laser, infrared, or other electronic device wirelessly tracking an interior surface of the pipeline to determine travel distance.

The chokeable pig 300 can include a choke 306 in at least one of the one or more segments 302. The choke 306 can be operable to alter fluid flow within the pipeline, which can disrupt, prevent, and/or eliminate slugging within the pipeline. Slugging can be generated within the pipeline for a number of reasons including a non-optimal flow pattern. The chokeable pig 300 and the choke 306 included therewith can be introduced into the pipeline to produce a more optimal flow pattern, thus eliminating existing slugs and/or prevent the development of new slugs.

The choke 306 can be adjustable depending on the location of the chokeable pig 300, the fluid flow pattern, and/or the desired optimal flow pattern. The choke 306 can be operable to have an inlet flow side 308 and an outlet flow side 310 and a choke point 312 positioned therebetween. The inlet flow side 308 can be operable to receive fluid flow from the pipeline while the outlet flow side 310 can be operable to introduce the adjusted fluid flow into the pipeline. The choke point 312 can have an adjustable diameter which allows the choke 306 to generate the desired optimal flow at the outlet flow side 310 to prevent and/or eliminate slugging within the pipeline.

In at least one instance, the chokeable pig 300 can have a predetermined choke position for each of the one or more predetermined positions within the pipeline to induce the desired optimal flow therein. In other instances, the chokeable pig 300 can have a single predetermined choke position for each of the predetermined positions within the pipeline to induce the desired optimal flow.

Figure 4:
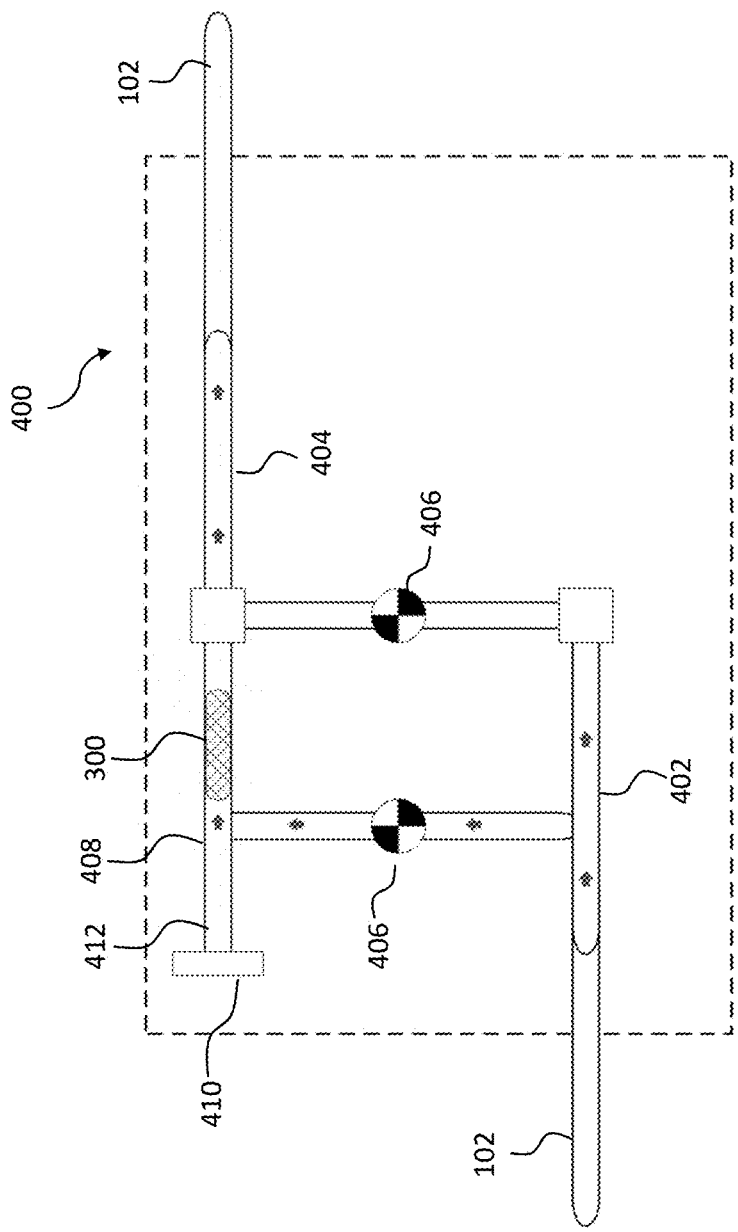
FIG. 4 is a diagrammatic representation of a chokeable pig within a launching station within a pipeline, according to at least one instance of the present inventive concept.

FIG. 4 illustrates a launching station having a pig disposed therein, according to at least one instance of the present inventive concept. A launching station 400 can be operable to introduce the chokeable pig 300 into a pipeline 102 through an inlet pipe 402. The launching station 400 can implement one or more valves 406 to direct flow from the pipeline 102 to through the inlet pipe 402 to introduce the chokeable pig 300 therein.

The chokeable pig 300 can be introduced into the launching station 400 through an access pipe 408. The access pipe 408 can have an access hatch 410 formed at a distal end 412 thereof. The access hatch 410 can allow introduction and/or removal of devices from the access pipe 408 of the launching station 400. After the chokeable pig 300 is placed within the access pipe 408, fluid flow of the inlet pipe 402 can be directed to the access pipe 408 through one or more valves 406, thereby allowing the chokeable pig 300 to be introduced into the pipeline 102 through an outlet pipe 404 without interrupting the flow through the pipeline 102.

Figure 5:
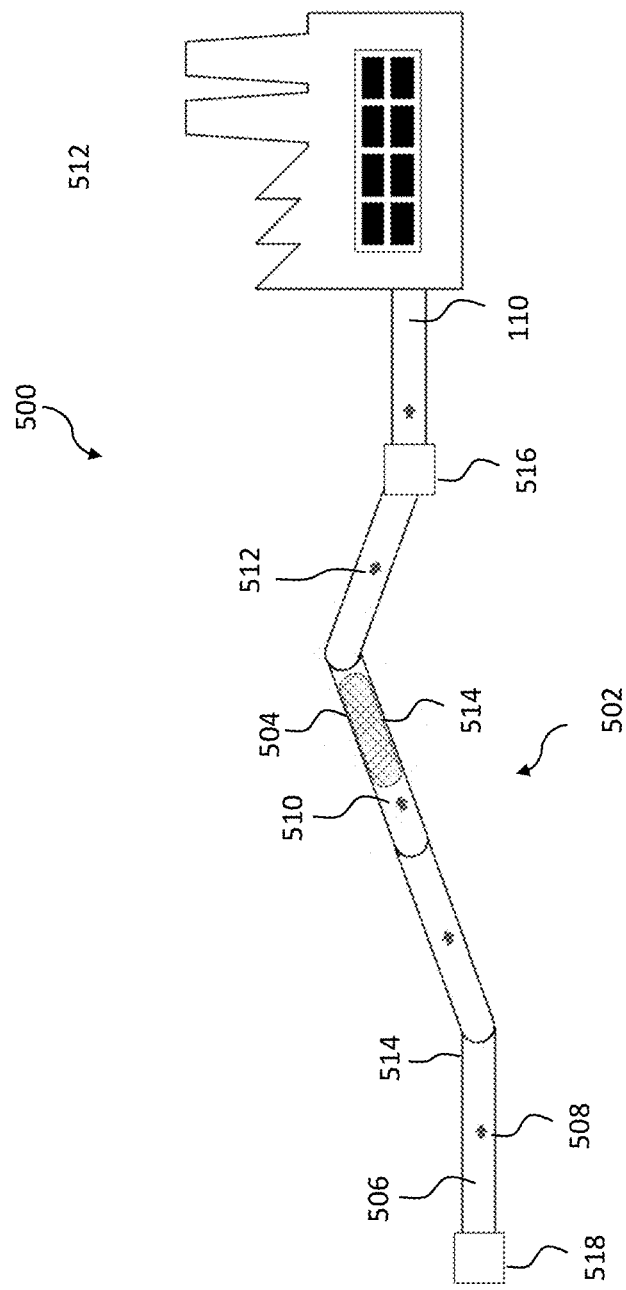
FIG. 5 is a diagrammatic representation of a chokeable pig within a pipeline connected with a facility, according to at least one instance of the present inventive concept.

FIG. 5 illustrates a chokeable pig within a pipeline, according to at least one instance of the present inventive concept. A pipeline 502 can be operable to receive a chokeable pig 504 within a fluid flow path 506 of the pipeline 502. The chokeable pig 504 can be operable to adjust a fluid flow 508 within the fluid flow path to prevent, eliminate and/or reduce slugs within the fluid flow path. As can be appreciated in FIG. 5, the fluid flow 508 can have a first fluid flow 510 upstream of the chokeable pig 504, and a second fluid flow 512 downstream of the chokeable pig 504. The first fluid flow 510 can be a non-desirable fluid flow pattern which can lead to slugging, while the second fluid flow 512 can be a more desirable optimized fluid flow pattern having passed through the chokeable pig 504, thus preventing and/or eliminating slugs within the pipeline 502. The first fluid flow 510 can be adjusted as it passes through at least a portion of the chokeable pig 504 to produce the second, optimized, fluid flow 512. The second fluid flow 512 can have a flow pattern and/or flow rate that is more desirable for fluid and/or structure of the pipeline.

The chokeable pig 504 can be operable to travel within the pipeline 502 to one or more positions 514 within the pipeline 502 at which the fluid flow 508 can require adjustment. The one or more positions 514 can be upstream of detected slugs and/or one or more positions within the pipeline 502 at which slugs may potentially form based on a fluid flow analysis of the pipeline 502 and/or one or more segments thereof. In at least one instance of the present inventive concept, the chokeable pig 504 can be adjustable having a predetermined choke position for each of the one or more positions 514 within the pipeline 502 depending on the desired optimal flow pattern based on the fluid flow analysis.

At the one or more positions 514 within the pipeline 502, the chokeable pig 504 can be operable to anchor within the pipeline 502 by engaging at least a portion of fluid flow path 506 of the pipeline. Upon returning the fluid flow 508 within the pipeline 502 to a more optimized fluid flow (e.g. the second fluid flow 512), the chokeable pig 504 can de-anchor and/or disengage from the fluid flow path 506 and continue traversing the pipeline 502. In at least one instance, the chokeable pig 504 can be operable to anchor at one position within the pipeline 502. In other instances, the chokeable pig 504 can be operable to anchor at more than one position within the pipeline 502.

The chokeable pig 504 can be operable to traverse the pipeline 502 and be received into a receiving station 516 at which point the chokeable pig 504 can be removed from the pipeline 502 in a procedure reverse of that implemented with a launching station 518 (described in more detail with respect to FIGS. 2 and 4). The chokeable pig 504 can thus be implemented within the pipeline 502 to induce a more desirable or optimal fluid flow pattern therein to prevent or eliminate slugging within the pipeline 502.

Figure 6:
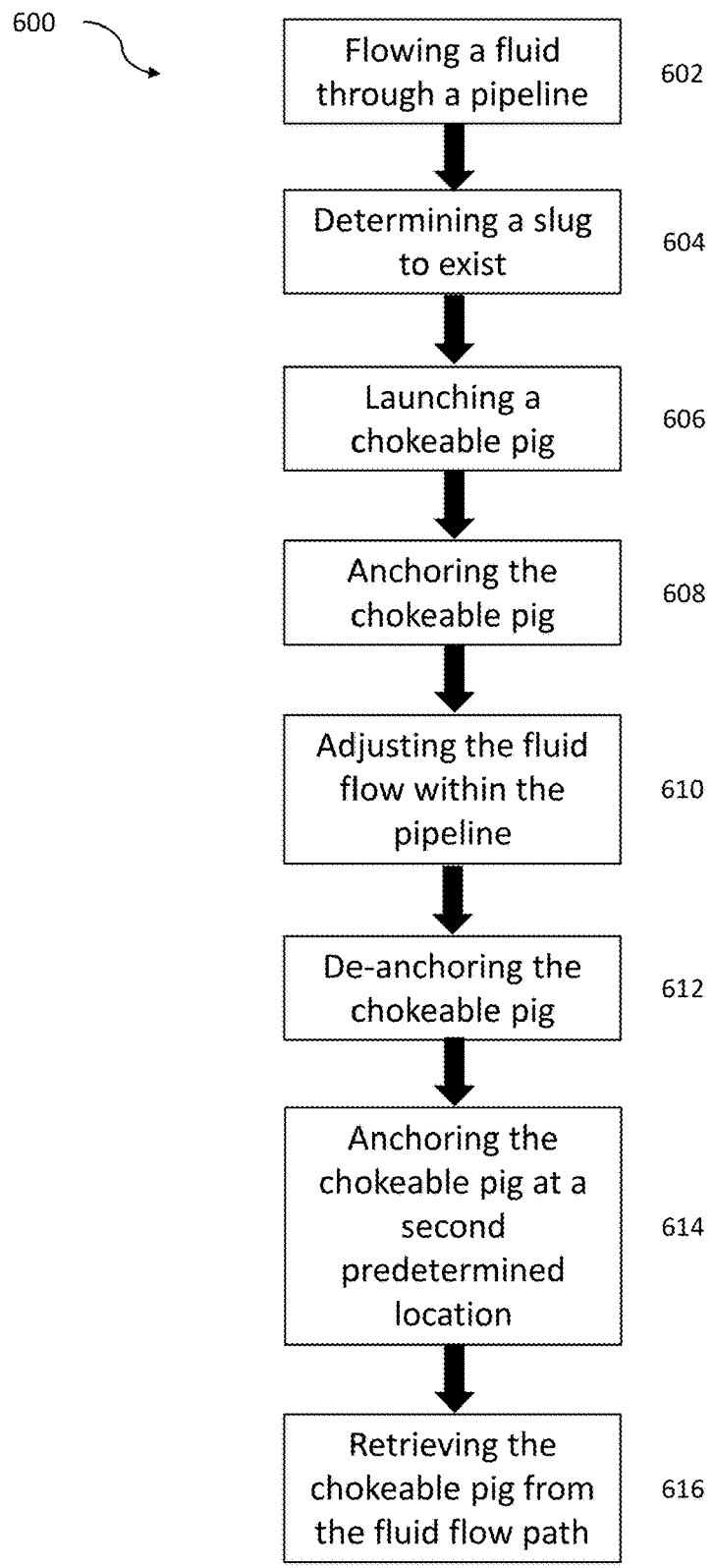
FIG. 6 is a flowchart of a gas slug clearing method within a pipeline, according to at least one instance of the present inventive concept.

Referring to FIG. 6, a flowchart of an example method 600 is presented in accordance with at least on instance of the present inventive concept. The method 600 is provided by way of example, as there is a variety of ways to carry out the method 600. Each block shown in FIG. 65 represents one or more processes, methods, or subroutines, carried out in the method 600. Furthermore, the illustrated order of blocks is illustrative only and the order of the blocks can change according to the present inventive concept. Additional blocks may be added or fewer blocks can be utilized, without deviating from the present inventive concept. The method 600 can begin at block 602.

At block 602, a fluid flow can be flowed through a pipeline. The pipeline can define a fluid flow path formed therethrough. The pipeline can be operable to transport a liquid fluid, a gas fluid, and/or combinations thereof. The fluid flow path can be an inner bore formed through one or more substantially tubular pipe segments coupled together. The method 600 can then proceed to block 604.

At block 604, a slug can be determined to exist, have formed, and/or have the potential for form within the fluid flow path of the pipeline. The slug can be a gaseous slug, a liquid slug, and/or a combination thereof. In at least one instance, a plurality of slugs can be determined to exist within the pipeline at one or more predetermined locations. The method 600 can then proceed to block 606.

At block 606, a chokeable pig can be launched into the fluid flow path. The chokeable pig can be introduced into the fluid flow path via one or more launching stations, while using the fluid flow within the fluid flow path to traverse the pipeline. The method 600 can then proceed to block 608.

At block 608, the chokeable pig can be anchored at a predetermined location within the fluid flow path. The chokeable pig can use the fluid flow within the pipeline to traverse at least a portion of the pipeline, and anchor at the predetermined location within the pipeline. In at least one instance of the present inventive concept, the predetermined location is upstream of at least one slug within the fluid flow path. The method 600 can then proceed to block 610.

At block 610, the fluid flow within the pipeline can be adjusted as the fluid flow passes through at least a portion of the chokeable pig, thereby producing a more optimal fluid flow through the pipeline. The method 600 can then proceed to block 612.

At block 612, the chokeable pig can be de-anchored from the predetermined location. Upon de-anchoring, the chokeable pig can continue using the fluid flow within the fluid flow path to traverse the pipeline. The method 600 can then proceed to block 614.

At block 614, the chokeable pig can be anchored at a second predetermined location within the fluid flow path. The second predetermined location within the fluid flow path can be any location downstream of the predetermined location as the chokeable pig traverses the pipeline. The method 600 can then proceed to block 616.

At block 616, the chokeable pig can be retrieved from the fluid flow path. The chokeable pig can traverse the pipeline and be removed from the pipeline at a receiver station.

While preferred examples of the present inventive concept have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the present inventive concept described herein can be employed in practicing the present inventive concept. It is intended that the following claims define the scope of the present inventive concept and that methods and structures within the scope of these claims and their equivalents be covered thereby.

What is claimed is:

1. A method to stabilize flow in a pipeline, the method comprising:
   flowing a fluid flow through the pipeline, the pipeline defining a fluid flow path therethrough;
   analyzing the fluid flow to detect a non-optimal flow pattern;
   determining a location within the fluid flow path to anchor a chokeable pig based on the non-optimal flow pattern;
   launching the chokeable pig into the fluid flow path after detection of the non-optimal flow pattern and determining of the location;
   anchoring the chokeable pig at the location; and
   adjusting the fluid flow through the pipeline.

2. The method of claim 1, further comprising:
   de-anchoring the chokeable pig from the location.

3. The method of claim 1, further comprising:
   retrieving the chokeable pig from the fluid flow path.

4. The method of claim 1, wherein the chokeable pig introduces a choke point in the fluid flow path, the chokeable pig operable to receive a fluid flow at an inlet and produce an adjusted fluid flow at an outlet, thereby inducing an optimal fluid flow pattern within the pipeline.

5. The method of claim 1, wherein the chokeable pig has an adjustable choke.

6. The method of claim 1, further comprising:
   anchoring the chokeable pig at a second predetermined location within the fluid flow path.

7. The method of claim 1, wherein the chokeable pig has a predetermined choke position for the slugging-location within the pipeline.

8. The method of claim 1, wherein anchoring the chokeable pig includes securing a portion of the chokeable pig to an interior sidewall of the pipeline.

9. The method of claim 1, wherein the non-optimal flow pattern is a slug, the slug is at least one of a gaseous slug or a liquid slug.

10. The method of claim 1, wherein the fluid flow path of the pipeline is fluidly coupled with a facility.

11. The method of claim 1, wherein adjusting the fluid flow path produces an optimum fluid flow pattern within the pipeline.

12. A pipeline intervention chokeable pig system, the system comprising:
   a pipeline defining a fluid flow path operable to receive a fluid flow therein;
   a launcher fluidly coupled with the pipeline, the launcher including an access pipe and an access hatch coupled with a distal end of the access pipe;
   a pig device operable to be anchored at one or more predetermined locations within the fluid flow path of the pipeline, the one or more predetermined locations determined based on detection of a non-optimal flow pattern, the pig device operable to be introduced into the fluid flow via the launcher to traverse along the pipeline to the one or more predetermined locations after detection of the non-optimal flow pattern and determining of the one or more predetermined locations, the pig device operable to receive the fluid flow therethrough; and
   a choke coupled with the pig device and disposed within the fluid flow.

13. The system of claim 12, wherein the choke is adjustable.

14. The system of claim 12, wherein the pig device includes at least one anchor operable to engage at least a portion of an interior surface of the pipeline.

15. The system of claim 12, wherein the pig device is operable to de-anchor within the pipeline.

16. The system of claim 12, wherein the pig device is operable to receive a first fluid flow at an inlet upstream of the choke and produce a second fluid flow downstream of the choke, the second fluid flow having an optimized fluid flow pattern relative to the first fluid flow.

17. The system of claim 12, wherein the pig device is operable to be placed in the access pipe via the access hatch and the access pipe is operable to receive at least a portion of the fluid flow therein.

18. The system of claim 12, further comprising:
   a receiver station operable to receive the pig device therein downstream of the launcher.

19. The system of claim 12, further comprising:
   one or more sensors operable to determine a location of the pig device within the pipeline.

20. The system of claim 12, wherein the pig device is operable to releasably anchor within the pipeline.

* * * * *